United States Patent
Bayer et al.

(10) Patent No.: US 10,447,161 B2
(45) Date of Patent: Oct. 15, 2019

(54) INVERTING BUCK-BOOST POWER CONVERTER

(71) Applicant: TEXAS INSTRUMENTS INCORPORATED, Dallas, TX (US)

(72) Inventors: Erich Bayer, Thonhausen (DE); Ivan Shumkov, Freising (DE); Nicola Rasera, Unterschleissheim (DE); Stefan Reithmaier, Vilsheim (DE); Roland Bucksch, Buch am Erlbach (DE); Christian Rott, Garching (DE); Florian Neveu, Feising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/837,914

(22) Filed: Dec. 11, 2017

(65) Prior Publication Data
US 2018/0287496 A1 Oct. 4, 2018

Related U.S. Application Data

(60) Provisional application No. 62/480,918, filed on Apr. 3, 2017.

(51) Int. Cl.
| | | |
|---|---|---|
| *H02M 3/158* | (2006.01) | |
| *H02M 1/08* | (2006.01) | |
| *H02M 3/00* | (2006.01) | |
| *H02M 1/00* | (2006.01) | |

(52) U.S. Cl.
CPC .......... *H02M 3/1582* (2013.01); *H02M 1/08* (2013.01); *H02M 3/005* (2013.01); *H02M 2001/0054* (2013.01); *H02M 2001/0093* (2013.01)

(58) Field of Classification Search
CPC .... H02M 3/156; H02M 3/158; H02M 3/1582; H02M 3/1584; H02M 3/1588
See application file for complete search history.

(56) References Cited

U.S. PATENT DOCUMENTS

2002/0093315 A1* 7/2002 Sluijs .................. H02M 3/158
323/267

* cited by examiner

*Primary Examiner* — Gary L Laxton
(74) *Attorney, Agent, or Firm* — Andrew Viger; Charles A. Brill; Frank D. Cimino (57) ABSTRACT

In an example, a dual-phase inverting buck-boost power converter for use with at least first and second energy storage elements includes an inverting buck-boost power converter and an inverting boost converter. In an example, the inverting buck-boost power converter is coupled between an input node and an output node of the dual-phase inverting buck-boost power converter and includes a first plurality of switches operable to couple to the first energy storage element, wherein the inverting buck-boost power converter is operable to supply a first load current. In an example, the inverting boost converter is coupled in parallel with the inverting buck-boost power converter between the input node and the output node of the dual-phase inverting buck-boost power converter and includes a second plurality of switches operable to couple to the first and the second energy storage elements, wherein the inverting boost converter is operable to supply a second load current.

18 Claims, 5 Drawing Sheets

INVERTING BUCK-BOOST POWER CONVERTER

CROSS-REFERENCE TO RELATED APPLICATIONS

The present application claims priority to U.S. Provisional Patent Application No. 62/480,918 filed Apr. 3, 2017 by Erich Bayer et al. and entitled "DUAL PHASE MIXED INDUCTIVE-CAPACITIVE TOPOLOGY INVERTING BUCK-BOOST CONVERTER," which is incorporated herein by reference as if reproduced in its entirety.

BACKGROUND

Power converters for use in switched mode power supplies (SMPS) are electrical components that convert an input voltage to an output voltage that is less than the input voltage (in the case of a buck converter) or greater than the input voltage (in the case of a boost converter). Some converters can produce an output voltage that is either less than or greater than the input voltage (in the case of a buck-boost converter). SMPS power converters produce the output voltage through a series of switching actions that charge and discharge energy storage elements, such as inductors and/or capacitors.

SUMMARY

A dual-phase inverting buck-boost power converter for use in a system including at least first and second energy storage elements can include an inverting buck-boost power converter and an inverting boost converter. In some examples, the inverting buck-boost power converter is coupled between an input node and an output node of the dual-phase inverting buck-boost power converter and includes a first plurality of switches operable to couple to the first energy storage element, wherein the inverting buck-boost power converter is operable to supply a first load current. In some examples, the inverting boost converter is coupled in parallel with the inverting buck-boost power converter between the input node and the output node of the dual-phase inverting buck-boost power converter and includes a second plurality of switches operable to couple to the first and the second energy storage elements, wherein the inverting boost converter is operable to supply a second load current.

In some examples, a dual-phase inverting buck-boost power supply includes an inverting buck-boost power converter to couple to a first inductor. In some examples, the inverting buck-boost power converter comprises a first transistor coupled between an input node of the dual-phase inverting buck-boost power converter and a first node, wherein the first inductor is coupled between the first node and a ground voltage potential and a second transistor coupled between the first node and an output node of the dual-phase inverting buck-boost power converter. In some examples, the dual-phase inverting buck-boost power converter further includes an inverting boost power converter to couple to a second inductor and a capacitor, the dual-phase inverting buck-boost power converter coupled in parallel with the inverting buck-boost power converter. In some examples, the inverting boost power converter comprises a third transistor coupled between a second node and the ground voltage potential, wherein the second inductor is coupled between the input node of the dual-phase inverting buck-boost power converter and a second node and wherein the capacitor is coupled between the second node and a third node, a fourth transistor coupled between the third node and the ground voltage potential, and a fifth transistor coupled between the third node and the output node of the dual-phase inverting buck-boost power converter.

In some examples, a method of power conversion comprises charging, during a first charging mode, a first inductor by coupling the first inductor to a voltage source and conducting energy from the voltage source to the first inductor. The method also comprises charging, during a second charging mode, a second inductor by coupling the second inductor to a ground voltage potential to facilitate conduction of energy from the voltage source to the second inductor. The method further comprises discharging, during the second charging mode, a capacitor by coupling the capacitor to an output node and conducting energy from the capacitor to the output node. The method further comprises discharging, during a first discharging mode, the first inductor by coupling the first inductor to the output node and conducting energy from the first inductor to the output node. The method further comprises charging, during a second discharging mode, the capacitor by discharging the second inductor by coupling the capacitor to the ground voltage potential to facilitate conduction of energy from the second inductor to the capacitor.

BRIEF DESCRIPTION OF THE DRAWINGS

For a detailed description of various examples, reference will now be made to the accompanying drawings in which.

DETAILED DESCRIPTION

A switched mode power supply (SMPS) transfers power from an input power source to a load by switching one or more power transistors coupled through a switch node/terminal to an energy storage element (such as an inductor/transformer and/or capacitor), which is coupled to the load. An SMPS regulator includes an SMPS controller to provide gate drive to the power transistor(s), which can be external, or integrated with the controller as an SMPS switcher/converter (with a switch node output terminal). In common architectures/topologies (such as buck, boost, and buck-boost), the SMPS includes, in addition to the energy storage element(s), an output/bulk capacitor in parallel with the load, and the SMPS regulator switches the power transistor(s) to form circuit arrangements (at the switch node) with the energy storage element(s) to supply load current to the load, and to the output/bulk capacitor to maintain a regulated output voltage (filtering the switched load current). For example, an SMPS regulator can be coupled through the switch node/terminal to an energy storage inductor, which is switched between charge and discharge cycles, based on a pulse width modulated (PWM) duty cycle, to supply inductor current (e.g., current through the energy storage inductor) to the load, and to the output/bulk capacitor to filter the switched inductor current to maintain the regulated output voltage. An SMPS regulator can be configured for operation as a constant current source, with an energy storage element, but with no output/bulk capacitor.

An inverting buck-boost converter can be implemented using two power transistor switches (high side and low side), a power inductor, and an output capacitor. However, while functional, such inverting buck-boost converter suffers from low efficiency. For example, the transistor switches are selected to have voltage ratings such that they are capable of sustaining voltage levels at least equal to a magnitude of a maximum operating input plus output voltage (e.g., an absolute value of the maximum operating input voltage plus an absolute value of the maximum operating output voltage) of the inverting buck-boost converter. For a given on resistance (e.g., resistance of a transistor switch when turned on), a higher voltage rated transistor switch may have a larger size and therefore increased gate and drain associated charge losses than lower voltage rated transistor switches. The increase in charge losses may lead to increased power consumption and reduced operating efficiency. As a result, the larger size of the higher voltage rated transistor switches may lead to increased operating cost, increased manufacturing cost, and/or increased power consumption.

Disclosed herein are example architectures/topologies that provide for a dual-phase inverting buck-boost power converter that at least partially resolves the foregoing problems by mitigating excess power consumption in providing power to a load. The dual-phase inverting buck-boost power converter, in some examples, is implemented with inductive and capacitive energy storage elements to provide dual-phase operation that consistently provides power to a load at moderate current levels and momentarily or intermittently provides power to the load at high current levels. For example, when the load may benefit from the high current level, the dual-phase inverting buck-boost power converter may operate in a phase that provides the high current level to the bad. A determination that the load may benefit from the high current level may be made, for example, by monitoring a magnitude of an output voltage of the dual-phase inverting buck-boost power converter with respect to a magnitude of an input voltage of the dual-phase inverting buck-boost power converter. For example, when the magnitude of the output voltage of the dual-phase inverting buck-boost power converter is greater than the magnitude of the input voltage of the dual-phase inverting buck-boost power converter, the load may benefit from the high current level (e.g., to satisfy short-term operations of the load that are associated with an increased current draw by the load). Conversely, when the load may not benefit from the high current level, the dual-phase inverting buck-boost power converter may operate in a phase that provides the moderate current level to the bad.

In an example, the dual-phase inverting buck-boost power converter includes an inverting buck-boost converter coupled in parallel with an inverting boost converter (e.g., such as a hybrid or L-C inverting boost converter), where both the inverting buck-boost converter and the inverting boost converter are operable to supply current to a common (e.g., shared) load based at least partially on determined needs of the load. For example, the inverting buck-boost converter may have greater efficiency than the inverting boost converter at light and medium loads and low output voltage magnitude to input voltage magnitude ratios and may be operable to provide current to loads having these characteristics. The inverting boost converter may have greater efficiency than the inverting buck-boost converter at heavy loads and high output voltage magnitude to input voltage magnitude ratios and may be operable to provide current to loads having these characteristics in conjunction with the inverting buck-boost converter. In this way, the inverting buck-boost converter may operate at substantially all times when the dual-phase inverting buck-boost power converter is powered on and the inverting boost converter may operate only when the magnitude of the output voltage is greater than the magnitude of the input voltage and a heavy bad (e.g., a need for increased current and/or energy flow to the bad) exists. The dual-phase inverting buck-boost power converter improves over the standard inverting buck-boost power converter by enabling the use of transistor switches in the inverting boost converter to lower sustainable voltage level characteristics (e.g., and thus a smaller overall size than transistor switches in the inverting buck-boost converter), thereby increasing efficiency and reducing costs associated with the dual-phase inverting buck-boost power converter.

Figure 1A:
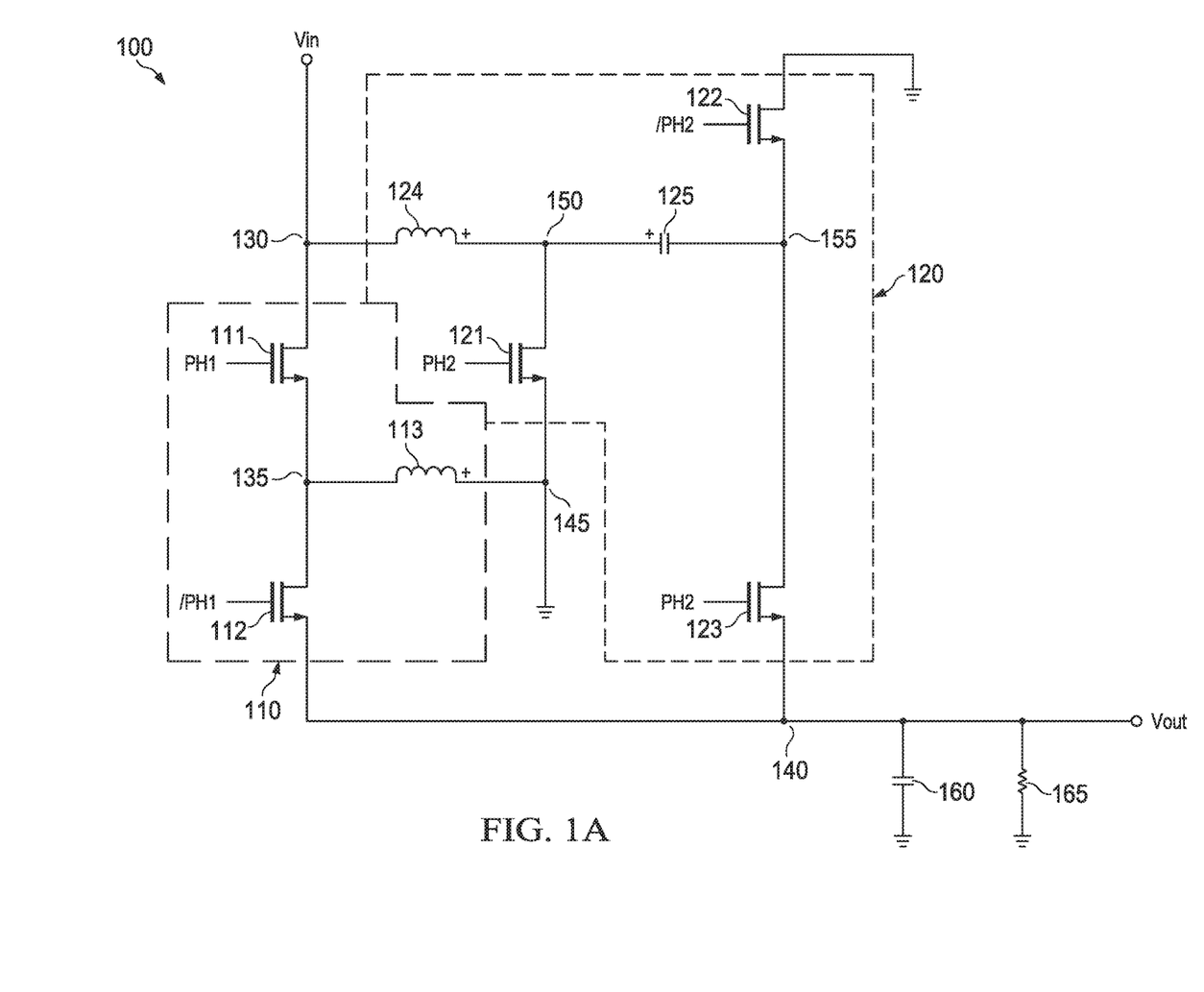
FIGS. 1A-1B illustrate an example dual-phase inverting buck-boost power converter architecture/topology in accordance with this disclosure.

Referring now to FIG. 1A, a schematic diagram of an illustrative dual-phase inverting buck-boost power converter 100 in accordance with this disclosure is shown. The dual-phase inverting buck-boost power converter 100 may, for example, receive an input voltage and produce an output voltage that is less than the input voltage, approximately the same as the input voltage, or greater than the input voltage. The dual-phase inverting buck-boost power converter 100 may be implemented, for example, as a standalone device (e.g., implemented on its own electrical die, enclosed within its own chip package, etc.) or may be implemented with other devices (e.g., on an electrical die including other devices, enclosed in an chip package that includes other devices, etc.). In an example, the dual-phase inverting buck-boost power converter 100 may be operable to couple to one or more other components separate from the dual-phase inverting buck-boost power converter 100 to provide power conversion/supply operations. Such components may include, for example, energy storage capacitors and/or inductors, as will be discussed in greater detail below. In another example, the other components may be implemented along with the dual-phase inverting buck-boost power converter 100, for example, on a same die, in a common (e.g., shared) chip package, etc.

In an example, the dual-phase inverting buck-boost power converter 100 includes an inverting buck-boost converter 110 and an inverting boost converter 120. The inverting buck boost converter 110 may include a switch 111, a switch 112, and an inductor 113. The inverting boost converter 120 may include a switch 121, a switch 122, a switch 123, an inductor 124, and a capacitor 125. The switches 111, 112, 121, 122, and 123 are, in some examples, transistor switches. For example, the switches 111, 112, 121, 122, and 123 may be n-type metal oxide semiconductor field effect (NMOS) transistors. In other examples, the switches 111, 112, 121, 122, and/or 123 may, collectively or individually, be p-type metal oxide semiconductor field effect (PMOS) transistors, bipolar junction transistors, or any other suitable form of transistor or switching technology. Each of the switches 111, 112, 121, 122, and 123, in an example, may include a respective drain terminal, source terminal, and gate terminal. Each of the switches 111, 112, 121, 122, and 123 may be configured to operate as a switch that conducts between two terminals (e.g., a respective drain terminal and source terminal) based on a value received at a third terminal (e.g., a respective gate terminal). For example, when a voltage level of a signal received at a respective gate terminal of one of the switches 111, 112, 121, 122, or 123 relative to the source terminal of that same switch ("Vgs") exceeds a threshold, the respective switch 111, 112, 121, 122, or 123 may conduct current between its drain terminal and source terminal. This condition is referred to as the respective switch 111, 112, 121, 122, or 123 being turned "on." Conversely, for example, when the Vgs of one of the switches 111, 112, 121, 122, or 123 does not exceed the threshold, the respective switch 111, 112, 121, 122, or 123 does not conduct current between its drain terminal and source terminal. This condition is referred to as the respective switch 111, 112, 121, 122, or 123 being turned "off." In other examples, switches 122 and 123 can be replaced with diodes.

In an example, a drain terminal of the switch 111 is coupled to a node 130, a source terminal of the switch 111 is coupled to a node 135, and a gate terminal of the switch 111 is operable to receive a first control signal. In an example, a drain terminal of the switch 112 is coupled to the node 135, a source terminal of the switch 112 is coupled to a node 140 and a gate terminal of the switch 112 is operable to receive an inverse of the first control signal (e.g., such that the switch 112 is turned off when the switch 111 is turned on, and vice versa). In an example, the inductor 113 is coupled between the node 135 and a node 145 and the inductor 124 is coupled between the node 130 and a node 150. In an example, a drain terminal of the switch 121 is coupled to the node 150, a source terminal of the switch 121 is coupled to the node 145, and a gate terminal of the switch 121 is operable to receive a second control signal.

In an example, the capacitor 125 is coupled between the node 150 and a node 155. In some examples, the capacitor 125 may be polarized and may have a terminal with a positive polarity coupled to the node 150 and a terminal with a negative polarity coupled to the node 155. In an example, a drain terminal of the switch 122 is coupled to the ground voltage potential, a source terminal of the switch 122 is coupled to the node 155, and a gate terminal of the switch 122 is operable to receive an inverse of the second control signal. In an example, a drain terminal of the switch 123 is coupled to the node 155, a source terminal of the switch 123 is coupled to the node 140, and a gate terminal of the switch 123 is operable to receive the second control signal. In some examples, a load capacitor 160 and/or a bad resistor 165 may be coupled between the node 140 and the ground voltage potential to facilitate current and/or energy flow through the dual-phase inverting buck-boost power converter 100, while in other examples these components may be omitted from the dual-phase inverting buck-boost power converter 100 and/or implemented external to the dual-phase inverting buck-boost power converter 100. In an example, the output voltage of the dual-phase inverting buck-boost power converter 100 is provided at node 140 and the input voltage for conversion to the output voltage by the dual-phase inverting buck-boost power converter 100 is received at node 130.

Figure 1B:
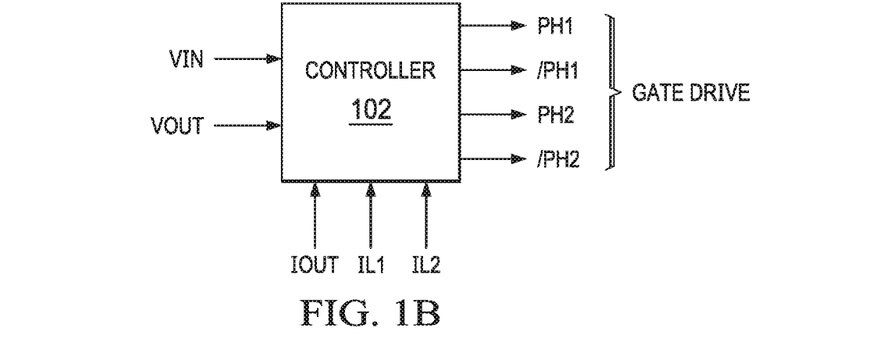

Referring now to FIG. 1B, in an example, the dual-phase inverting buck-boost power converter 100 of FIG. 1A includes, or is configured to couple to, a controller 102 operable to at least partially control operation of the dual-phase inverting buck-boost power converter 100. For example, the controller may monitor any one or more of a current draw IOUT of a load coupled to the dual-phase inverting buck-boost power converter 100, a magnitude of an output voltage VOUT of the dual-phase inverting buck-boost power converter 100, a magnitude of an input voltage VIN of the dual-phase inverting buck-boost power converter 100, a current IL1 flowing through the inverting buck-boost converter 110, and/or a current IL2 flowing through the inverting boost converter 120 and control the dual-phase inverting buck-boost power converter 100 according to at least one of the foregoing characteristics. In some examples, the controller 102 controls the dual-phase inverting buck-boost power converter 100 through at least some of control signals PH1, PH2, /PH1, and/or /PH2 as illustrated in FIGS. 1A and 1B and discussed in greater detail below with respect to FIG. 4. For example, when the controller determines that the magnitude of the output voltage of the dual-phase inverting buck-boost power converter 100 is greater than the magnitude of the input voltage of the dual-phase inverting buck-boost power converter 100, the controller may determine that a load coupled to the dual-phase inverting buck-boost power converter 100 may benefit from an increased current level. When the controller determines that the load coupled to the dual-phase inverting buck-boost power converter 100 may benefit from the increased current level, the controller may control the inverting boost converter 120 to operate in addition to controlling the inverting buck-boost converter 110 to operate. When the controller determines that the load coupled to the dual-phase inverting buck-boost power converter 100 may no longer benefit from the increased current level, the controller may control the inverting boost converter 120 to cease operating while continuing to control the inverting buck-boost converter 110 to operate. In another example, the load coupled to the dual-phase inverting buck-boost power converter 100 may request the increased current level by providing a signal to the controller indicating that the load may benefit from the increased current level and the controller may determine that the load may benefit from the increased current level subsequent to receipt of the signal from the load. In at least some examples, the controller may output PH1 and/or PH2 and the dual-phase inverting buck-boost power converter 100 may comprise one or more inverters (not shown) operable to invert PH1 to form /PH1 and/or invert PH2 to form /PH2.

Returning now to FIG. 1A, each of the switches 111 and 112 may be operable to sustain voltage levels of approximately a magnitude of the input voltage plus a magnitude of the output voltage of the dual-phase inverting buck-boost power converter 100. For example, a transistor voltage rating of the switches 111 and 112 may be sufficient to sustain the voltage levels of approximately the magnitude of the input voltage plus the magnitude of the output voltage of the dual-phase inverting buck-boost power converter 100. In an example, the switches 121, 122, and 123 may be operable to sustain voltage levels of approximately a magnitude of the output voltage of the dual-phase inverting buck-boost power converter 100. In this way, the switches 121, 122, and 123 may have a lower voltage rating and therefore lower switching losses and a smaller overall size than other switches (e.g., such as the switches 111 or 112).

In an example, the switches 111, 112, 121, 122, and 123 may be implemented on a single electronic die and/or enclosed within a single chip package and may be coupled to the inductors 113 and 124 and capacitor 125 through external connections (e.g., such as pins of the chip package and/or metal traces or other conductive couplings of an electronic circuit board). In another example, the inductors 113 and 124 and/or the capacitor 125 may be implemented on the same electronic die as the switches 111, 112, 121, 122, and 123, either as discrete (separate) electrical components fabricated and coupled to the die or as silicon implementations of the components disposed on the die. Values of the inductors 113, 124, and capacitor 125 may be chosen, for example, based on a desired performance of the dual-phase inverting buck-boost power converter 100, a desired output voltage of the dual-phase inverting buck-boost power converter 100, an intended input voltage of the dual-phase inverting buck-boost power converter 100, or any other suitable criteria. In at least one example, the inductor 113 may have a first inductance value, the inductor 124 may have a second inductance value that may be the same as, or different from, the first inductance value, and the capacitor 125 may have a value such that the capacitor is capable of storing and discharging a voltage magnitude equal to or greater than the desired output voltage of the dual-phase inverting buck boost power converter 100.

The dual-phase inverting buck-boost power converter 100 may operate by switching at least some of the switches 111, 112, 121, 122, and/or 123 on or off to control when, and how much, voltage and/or current flows through the dual-phase inverting buck-boost power converter 100. For example, in single-phase operation the dual-phase inverting buck-boost power converter 100 may operate by switching the switches 111 and 112 on or off while the switches 121, 122, and 123 remain off. In dual-phase operation, the dual-phase inverting buck-boost power converter 100 may operate by switching all of the switches 111, 112, 121, 122, and 123 on or off. The switches 111 and 112 and the switches 121, 122, and 123 may be controlled at different switching frequencies. For example, the switches 111 and 112 may be controlled to switch at a first switching frequency that may be a multiple X of a second switching frequency at which the switches 121, 122, and 123 may be controlled.

Figure 2:
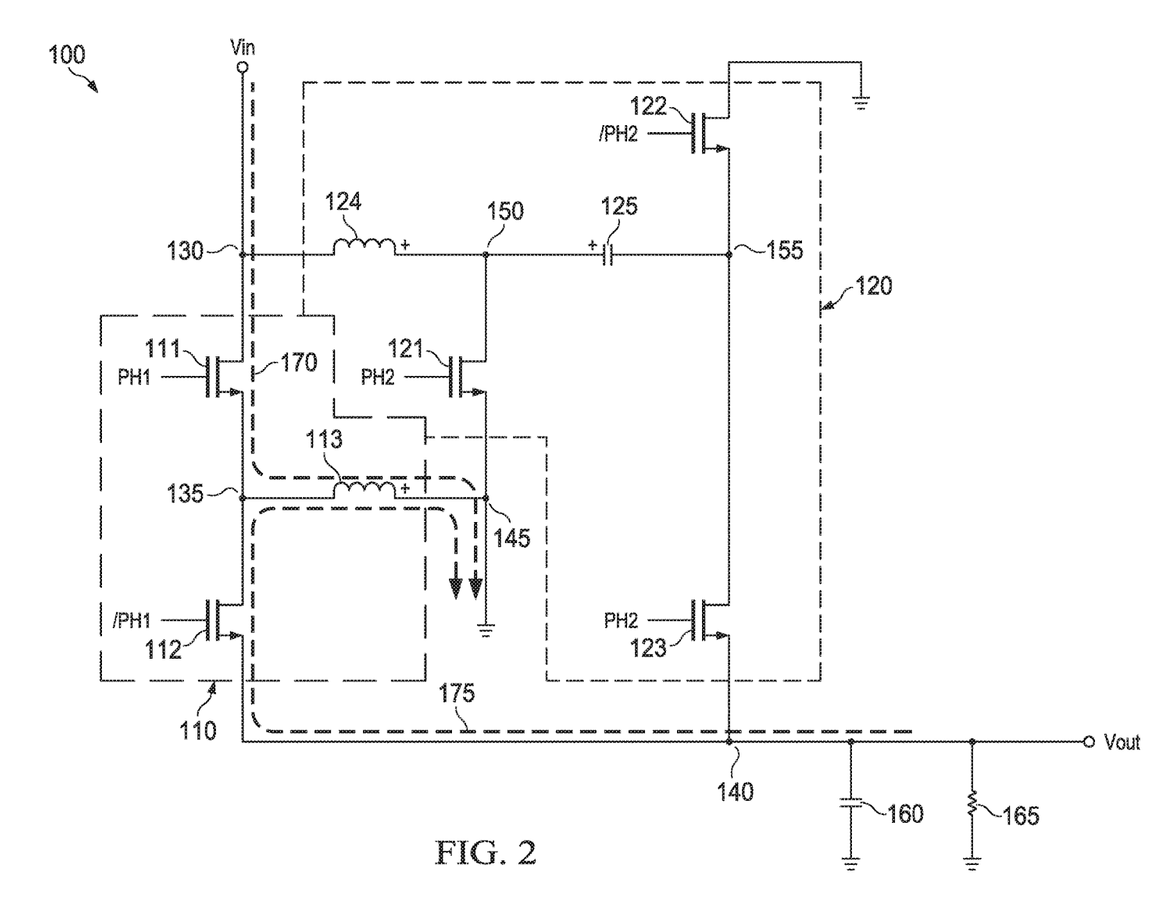
FIG. 2 is a schematic diagram of the illustrative dual-phase inverting buck-boost power converter in single-phase operation in accordance with this disclosure.

Referring now to FIG. 2, a schematic diagram of the illustrative dual-phase inverting buck-boost power converter 100 in single-phase operation in accordance with this disclosure is shown. As discussed above with respect to FIGS. 1A-1B, the dual-phase inverting buck-boost power converter 100 may be operable in both single-phase and dual-phase operation modes. During the single-phase operation mode, in an example only the inverting buck-boost converter 110 may be operable. During the single-phase operation mode, the dual-phase inverting buck-boost power converter 100 may alternate between charging the inductor 113 from the input voltage via the switch 111 (e.g., a charging mode) and discharging the inductor 113 to the node 140 via the switch 112 (e.g., a discharging mode).

For example, when the first control signal is high (e.g., a digital logic "1" or another voltage level that causes the Vgs to exceed a gate to source threshold of the switch 111), the switch 111 may turn on and conduct between its drain terminal coupled to node 130 and its source terminal coupled to node 135. Correspondingly, switch 112 receives an inverse of the first control signal which, when the first control signal is sufficient to cause the switch 111 to turn on, may be insufficient to cause the switch 112 to turn on and the switch 112 may not conduct between its drain terminal coupled to node 135 and its source terminal coupled to node 140. When the first control signal is low (e.g., a digital logic "0" or another voltage level that, relative to the voltage at the source terminal, does not exceed a gate to source threshold of the switch 111), the switch 111 may turn off and may not conduct between its drain terminal coupled to node 130 and its source terminal coupled to node 135. Correspondingly, switch 112 receives an inverse of the first control signal which, when the first control signal is insufficient to cause the switch 111 to turn off, may be sufficient to cause the switch 112 to turn on and the switch 112 may conduct between its drain terminal coupled to node 135 and its source terminal coupled to node 140.

During the charging mode, when the switch 111 is turned on and the switch 112 is turned off, energy (e.g., voltage and current (power) for a given unit of time) is transferred through the switch 111 into the inductor 113 where it is stored. Subsequently, during the discharging mode, when the switch 111 is turned off and the switch 112 is turned on, the stored energy is transferred from the inductor 113 through the switch 112 to the node 140 for output by the dual-phase inverting buck-boost power converter 100. A path of energy flow during the charging mode is indicated by the broken line 170 and a path of energy flow during the discharging mode is indicated by a broken line 175. During the discharging mode, because current and/or energy flowing through an energy storage inductor 113 may resist a change in direction, current and/or energy flows out of the inductor 113 in a negative direction (e.g., in a direction opposite to a direction in which the energy flowed into the inductor 113), thereby resulting in a negative voltage present at the node 140 after flowing through the switch 112.

Figure 3:
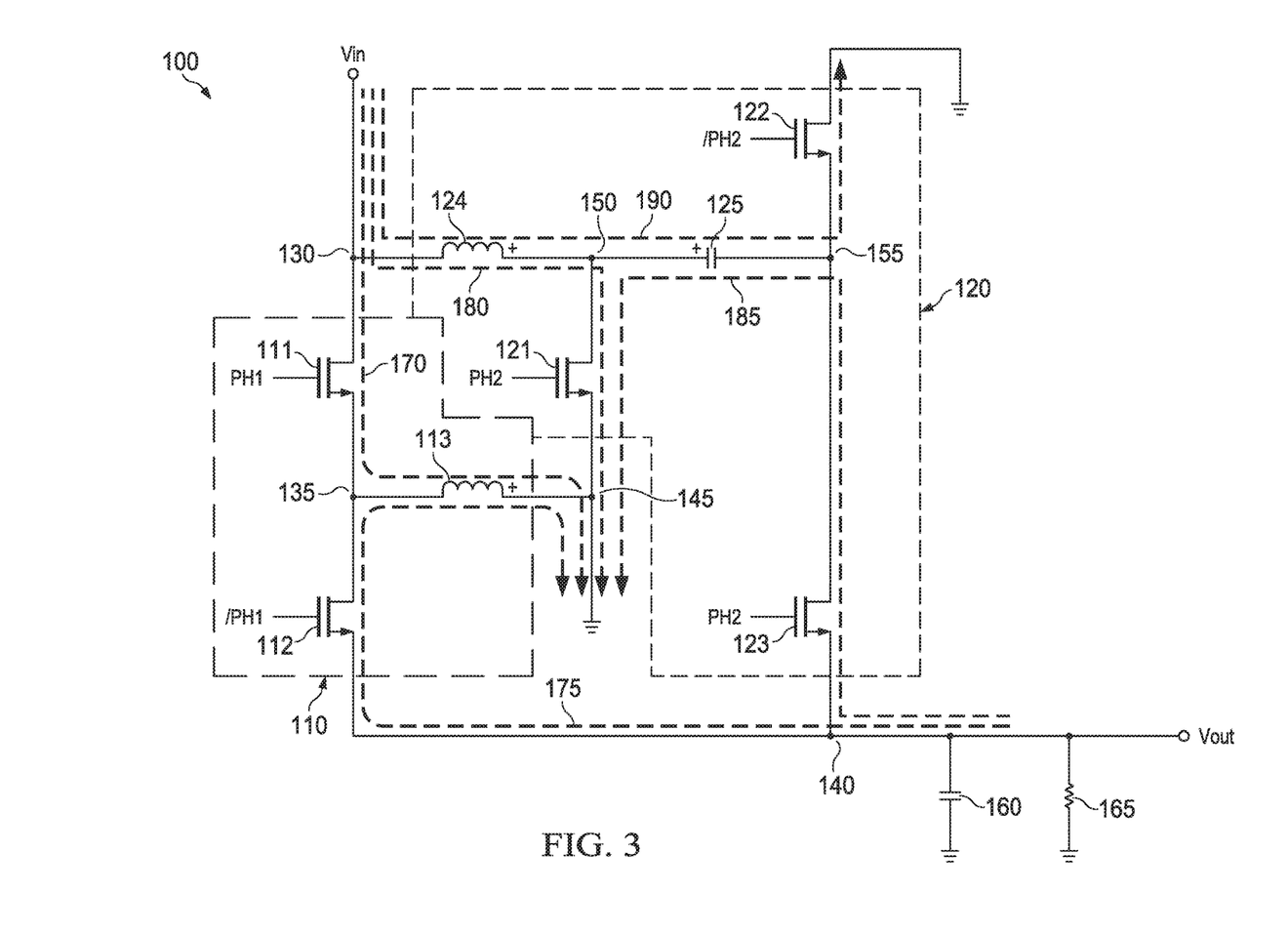
FIG. 3 is a schematic diagram of the illustrative dual-phase inverting buck-boost power converter in dual-phase operation in accordance with this disclosure.

Referring now to FIG. 3, a schematic diagram of the illustrative dual-phase inverting buck-boost power converter 100 in dual-phase operation in accordance with this disclosure is shown. As discussed above with respect to FIGS. 1A-1B, the dual-phase inverting buck-boost power converter 100 may be operable in both single-phase and dual-phase operation modes. During the dual-phase operation mode, in an example both the inverting buck-boost converter 110 may be operable (e.g., in a manner as discussed above with respect to FIG. 2, a description of which is not repeated here) and the inverting boost converter 120 may also be operable. During the dual-phase operation mode, the dual-phase inverting buck-boost power converter 100 may alternate between charging modes for each of the inverting buck-boost converter 110 and the inverting boost converter 120 and discharging modes for each of the inverting buck-boost converter 110 and the inverting boost converter 120.

For example, during the charging mode of the inverting buck-boost converter 110, the inductor 113 is charged. During the discharging mode of the inverting buck-boost converter 110 the inductor 113 is discharged to node 140. During the charging mode of the inverting boost converter 120, the inductor 124 is charged while the capacitor 125 is discharged to node 140. During the discharging mode of the inverting boost converter 120, the inductor 124 discharges to node 150 to charge the capacitor 125. In some examples, the charging mode and the discharging mode of the inverting buck-boost converter 110 and the inverting boost converter 120 may be synchronized (e.g., such that the inductor 113 and inductor 124 begin charging and the capacitor 125 begins discharging at substantially a same time). In other examples the charging mode and the discharging mode of the inverting buck-boost converter 110 and the inverting boost converter 120 may be fully independent in operation such that there may be no relation in timing between the charging mode and the discharging mode of the inverting buck-boost converter 110 and the inverting boost converter 120. In some examples, the inverting buck-boost converter 110 and the inverting boost converter 120 are each controlled by separate control signals that independently control operation of the inverting buck-boost converter 110 and the inverting boost converter 120.

When the second control signal is high (e.g. a digital logic "1" or another voltage level that causes Vgs to exceed a gate to source threshold of the switches 121 and 123), the switches 121 and 123 may turn on and conduct between their respective drain terminals and source terminals. For example, the switch 121 may turn on and conduct between its drain terminal coupled to node 150 and its source terminal coupled to node 145 and the switch 123 may turn on and conduct between its drain terminal coupled to node 155 and its source terminal coupled to node 140. Correspondingly, switch 122 may receive an inverse of the second control signal which, when the second control signal is sufficient to cause the switches 121 and 123 to turn on, may be insufficient to cause the switch 122 to turn on and the switch 122 may not conduct between its drain terminal and its source terminal. When the second control signal is low (e.g., a digital logic "0" or another voltage level that, relative to the voltage at the source terminal, does not exceed a gate to source threshold of the switches 121 and 123), the switches 121 and 123 may turn off and may not conduct between their respective drain terminals and source terminals. Correspondingly, switch 122 may receive an inverse of the second control signal which, when the second control signal is insufficient to cause the switches 121 and 123 to turn on, may be sufficient to cause the switch 122 to turn on and the switch 122 may conduct between its drain terminal coupled to the ground voltage potential and its source terminal coupled to the node 155.

During the charging mode, when the switches 121 and 123 are turned on and the switch 122 is turned off, energy is transferred into the inductor 124 where it is stored. Substantially simultaneously, energy is transferred from the capacitor 125 through the switch 123 to the node 140 for output by the dual-phase inverting buck-boost power converter 100. Subsequently, during the discharging mode, when the switches 121 and 123 are turned off and the switch 122 is turned on, the stored energy is transferred from the inductor 124 to the capacitor 125. A path of energy flow during the charging mode is indicated by the broken line 180 illustrating energy flow into the inductor 124 and the broken line 185 illustrating energy flow from the capacitor 125 to the node 140. A path of energy flow during the discharging mode is indicated by the broken line 190 illustrating energy flow from the inductor 124 to the capacitor 125 to charge the capacitor 125.

Figure 4:
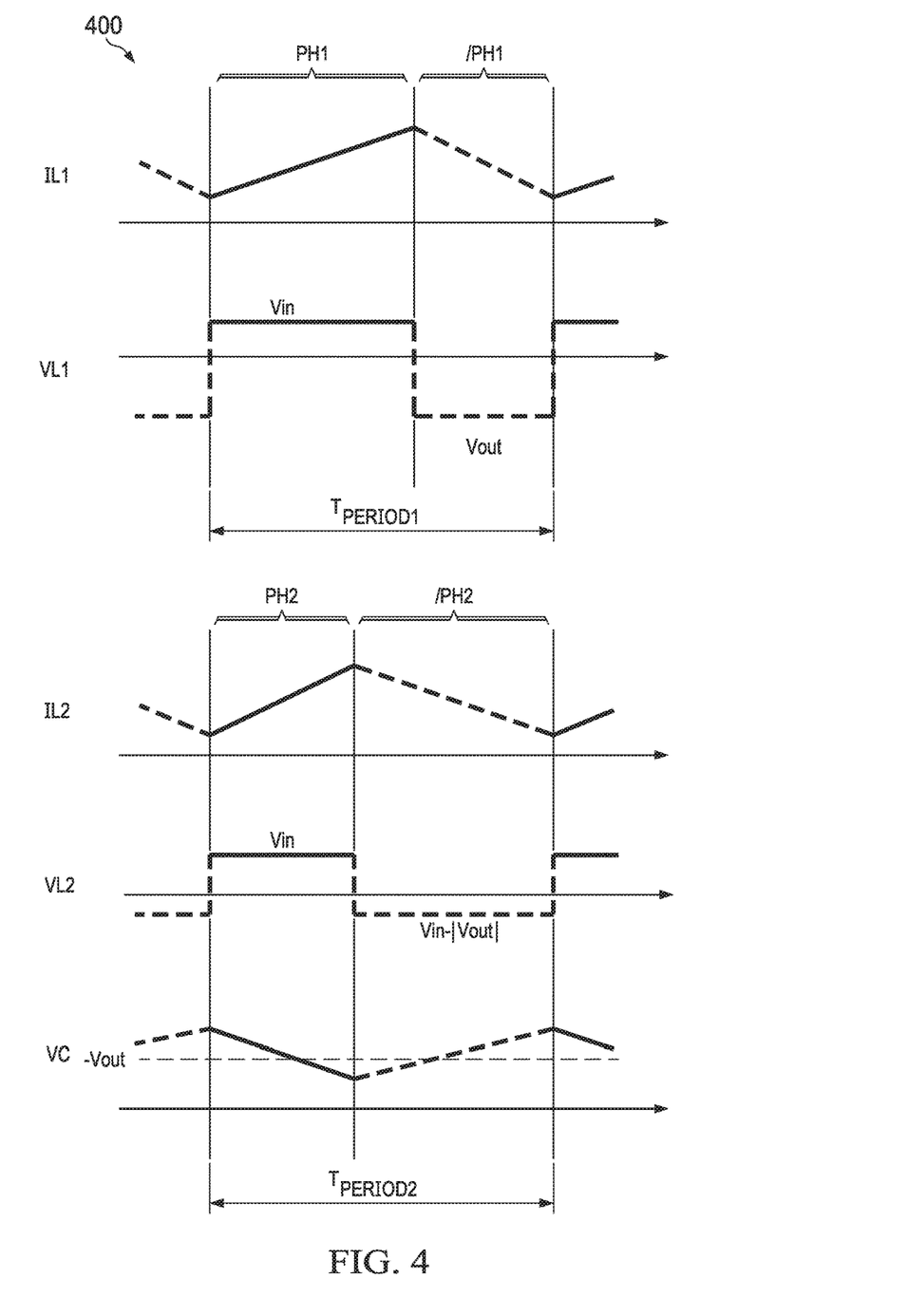
FIG. 4 is a graph of illustrative energy transfers of the dual-phase inverting buck-boost power converter in accordance with this disclosure.

Referring now to FIG. 4, a graph 400 of illustrative energy transfers of the dual-phase inverting buck-boost power converter 100 in accordance with this disclosure is shown. FIG. 4 visually illustrates the preceding descriptions of the examples of FIG. 2 and FIG. 3. In FIG. 4, the first control signal is indicated as PH1, the inverse of the first control signal is indicated as /PH1, the second control signal is indicated as PH2, and the inverse of the second control signal is indicated as /PH2. Additionally, a current flowing through the inductor 113 is illustrated as IL1, a voltage present across the inductor 113 is illustrated as VL1, a current flowing through the inductor 124 is illustrated as 1L2, a voltage present across the inductor 124 is illustrated as VL2, a voltage present across the capacitor 125 is illustrated as VC, the input voltage is illustrated as VIN, and the output voltage is illustrated as VOUT. A period of the switching frequency of the dual-phase inverting buck-boost power converter 100 is illustrated as $T_{PERIOD1}$ and $T_{PERIOD2}$, where $T_{PERIOD1}$ and $T_{PERIOD2}$ may be substantially the same value or may be different values.

As shown in FIG. 4, when PH1 is high (e.g., equal to "1"), energy flows into the inductor 113 to charge the inductor 113 and a voltage present across the inductor 113 may be approximately equal to the input voltage of the dual-phase inverting buck-boost power converter 100. When PH1 is low (e.g., equal to "0"), and correspondingly /PH1 is high, energy flows out of the inductor 113 to the node 140 such that a magnitude of the output voltage of the dual-phase inverting buck-boost power converter 100 is approximately equal to the voltage across the inductor 113. Similarly, when PH2 is high, energy flows into the inductor 124 to charge the inductor 124 and a voltage present across the inductor 124 may be approximately equal to the input voltage of the dual-phase inverting buck-boost power converter 100. When PH2 is high, energy also may flow out of the capacitor 125 to the node 140 such that a magnitude of the output voltage of the dual-phase inverting buck-boost power converter 100 is approximately equal to the voltage across the capacitor 125. When PH2 is low, and correspondingly /PH2 is high, energy may flow out of the inductor 124 to charge the capacitor 125 and a voltage present across the inductor 124 may be approximately equal to the input voltage of the dual-phase inverting buck-boost power converter 100 minus the voltage present across the capacitor 125 (e.g., approximately a magnitude of the output voltage of the dual-phase inverting buck-boost power converter 100).

While PH1 and PH2 (and correspondingly /PH1 and /PH2) are shown as having substantially the same value at substantially the same time (e.g., having a same phase), such is not required. In operations, PH1 and PH2 may be controlled independently such that PH1 and PH2 transition high at substantially a same time, PH1 transitions high at substantially a same time as PH2 transitions low, PH2 transitions high at substantially a same time as PH1 transitions low, PH1 and PH2 transition low at substantially a same time, or any other relationship. For example, PH1 and PH2 may operate without any timing relationship between high or low signals of either PH1 or PH2. For example, variations in component characteristics (e.g., such as inductor size and correspondingly inductor charge time), desired output, delay, and/or other like characteristics may result in differences between PH1 and PH2 timings. In some examples, PH1 and PH2 may be phase shifted. This phase shift may, in some examples, further increase efficiency, a maximum current output of the dual-phase inverting buck-boost power converter 100, a maximum voltage output of the dual-phase inverting buck-boost power converter 100, or other characteristics of the dual-phase inverting buck-boost power converter 100.

Figure 5:
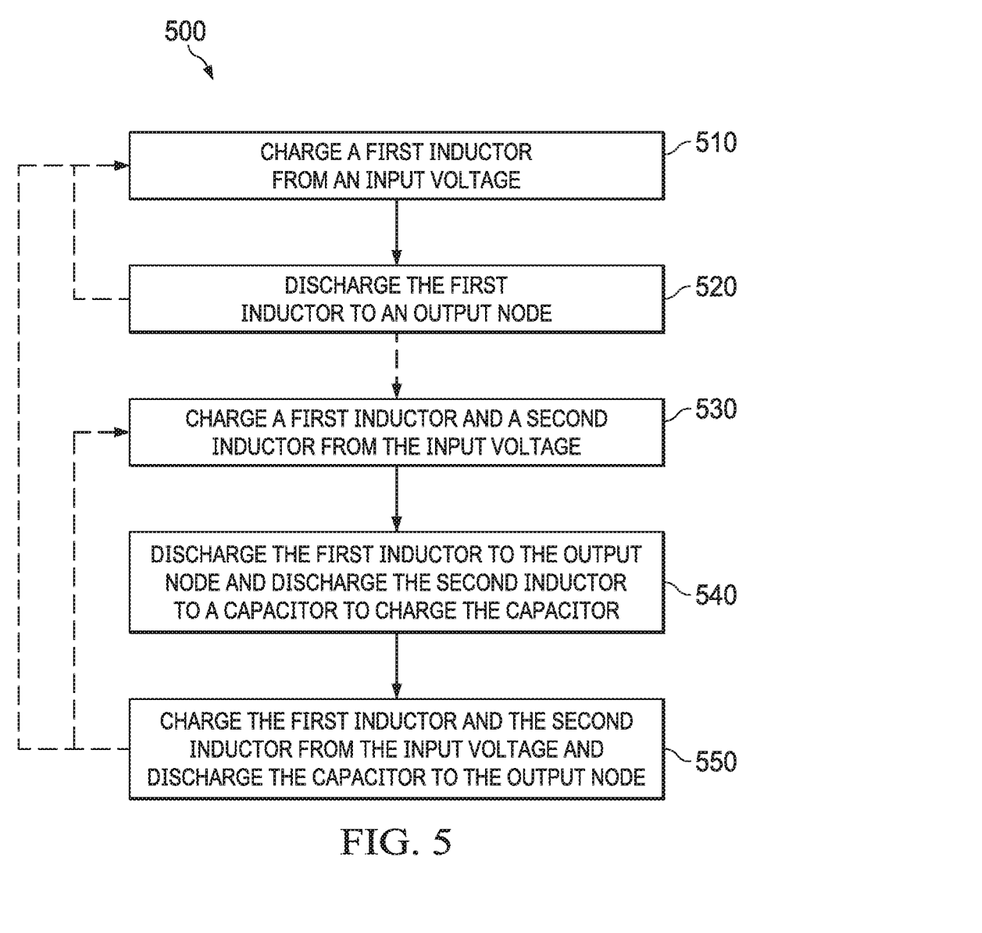
FIG. 5 is a flowchart of an illustrative method of power conversion in accordance with this disclosure.

Referring now to FIG. 5, a flowchart of an illustrative method 500 of power conversion in accordance with this disclosure is shown. The method 500 is performed, for example, by a dual-phase inverting buck-boost power converter such as the dual-phase inverting buck-boost power converter 100 having a structure as described above with respect to FIGS. 1A-1B and operating as described above with respect to FIGS. 2, 3, and 4.

At operation 510, a first inductor is charged from an input voltage of the dual-phase inverting buck-boost power converter. The first inductor is, for example, an inductor of an inverting buck-boost converter such as the inductor 113 of the inverting buck-boost converter 110. The first inductor is charged, for example, by coupling the first inductor to the input voltage of the dual-phase inverting buck-boost power converter via a switch of the dual-phase inverting buck-boost power converter to enable current to flow through the first inductor.

At operation 520, the first inductor is discharged to an output of the dual-phase inverting buck-boost power converter. The first inductor is discharged to the output of the dual-phase inverting buck-boost power converter, for example, by coupling the first inductor to an output node of the dual-phase inverting buck-boost power converter via a switch of the dual-phase inverting buck-boost power converter to enable current to flow from the first inductor to the output node.

When a bad coupled to the dual-phase inverting buck-boost power converter may benefit from the increased current level, the method 500 proceeds to operation 530. The increased current level may correspond to dual-phase operation of the dual-phase inverting buck-boost power converter where the increase is with respect to a current level of a single-phase operation of the dual-phase inverting buck-boost power converter. When the bad may not benefit from the increased current level, the method 500 returns to operation 510. The determination of whether the bad may benefit from the increased current level is made for example, by a controller coupled to the dual-phase inverting buck-boost power converter and one or more control signals received from the controller may control whether the method 500 returns to operation 510 or proceeds to operation 530, for example, without determination by the dual-phase inverting buck-boost power converter.

At operation 530, the first inductor and a second inductor are charged from the input voltage of the dual-phase inverting buck-boost power converter. The second inductor is, for example, an inductor of an inverting boost converter such as the inductor 124 of the inverting boost converter 120. The first inductor is charged, for example, by coupling the first inductor to the input voltage of the dual-phase inverting buck-boost power converter via a switch of the dual-phase inverting buck-boost power converter to enable current to flow through the first inductor. The second inductor is charged, for example, by coupling the second inductor to a ground voltage potential via a switch of the dual-phase inverting buck-boost power converter to enable current to flow through the second inductor. Although charging of both the first inductor and the second inductor are encompassed by operation 530, the charging of the first inductor and the charging of the second inductor may be performed independently. For example, no timing relationship is implied in the description of operation 530. The first inductor may be charged before, during, and/or after the second inductor (and vice versa), all of which are encompassed within the description of operation 530

At operation 540, the first inductor is discharged to an output of the dual-phase inverting buck-boost power converter and the second inductor is discharged to a capacitor to charge the capacitor. The capacitor is, for example, a capacitor of an inverting boost converter such as the capacitor 125 of the inverting boost converter 120. The first inductor is discharged to the output of the dual-phase, inverting buck-boost power converter, for example, by coupling the first inductor to the output node of the dual-phase inverting buck-boost power converter via a switch of the dual-phase inverting buck-boost power converter to enable current to flow from the first inductor to the output node. The second inductor is discharged to the capacitor, for example, by coupling the capacitor to a ground voltage, potential via a switch of the dual-phase inverting buck-boost power converter to complete an electrical path and allow current to flow through the path from the second inductor to the capacitor. Although discharging of both the first inductor and the second inductor are encompassed by operation 540, the discharging of the first inductor and the discharging of the second inductor may be performed independently. For example, no timing relationship is implied in the description of operation 540. The first inductor may be discharged before, during, and/or after the second inductor (and vice versa), all of which are encompassed within the description of operation 540.

At operation 550, the first inductor and the second inductor are charged from the input voltage of the dual-phase inverting buck-boost power converter, (e.g., as discussed above with respect to operation 530) and the capacitor is discharged to the output of the dual-phase inverting buck-boost power converter. The capacitor is discharged to the output of the dual-phase inverting buck-boost power converter, for example, by coupling the capacitor to the output node of the dual-phase inverting buck-boost power converter via a switch of the dual-phase inverting buck-boost power converter to enable current to flow from the capacitor to the output node. Although charging of both the first inductor and the second inductor, as well as discharging of the capacitor are encompassed by operation 550, the charging of the first inductor, the charging of the second inductor and/or discharging of the capacitor may be performed independently. For example, no timing relationship is implied in the description of operation 550. The first inductor may be charged before, during, and/or after the second inductor and/or discharging of the capacitor (and vice versa), all of which are encompassed within the description of operation 550.

When the load may continue to benefit from the increased current level, the method 500 returns to operation 530. When the load may not continue to benefit from the increased current level, the method 500 returns to operation 510. The determination of whether to return to operation 510 or return to operation 530 may be made, for example, by the controller coupled to the dual-phase inverting buck-boost power converter without action by the dual-phase inverting buck-boost power converter, for example, based on whether the controller determines that the load may continue to benefit from the increased current level.

While the operations of the method 500 have been discussed and labeled with numerical reference, the method 500 may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

In the foregoing discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device, element, or component couples to a second device, element, or component, that connection may be through a direct connection or through an indirect connection via other devices, elements, or components and connections. Similarly, a device, element, or component that is coupled between a first component or location and a second component or location may be through a direct connection or through an indirect connection via other devices, elements, or components and/or connections. A device that is "configured to" perform a task or function may be configured (e.g., programmed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrase "around voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means+/−10 percent of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A dual-phase inverting buck-boost power converter for use in a system including at least first and second inductors and a capacitor, comprising:
    an inverting buck-boost power converter coupled between an input node and an output node of the dual-phase inverting buck-boost power converter and comprising:
        a first switch and a second switch operable to couple to the first energy storage element, wherein the inverting buck-boost power converter is operable to supply a first load current:
        the first switch coupled between the first inductor and the input node of the dual-phase inverting buck-boost power converter,
        the first inductor coupled between the first switch and a ground voltage potential, and
        the second switch coupled between the first inductor and the output node of the dual-phase inverting buck-boost power converter; and
    an inverting boost converter coupled in parallel with the inverting buck-boost power converter between the input node and the output node of the dual-phase inverting buck-boost power converter and comprising a third switch, a fourth switch, and a fifth switch operable to couple to the second inductor and the capacitor, wherein the inverting boost converter is operable to supply a second load current,
    the second inductor coupled between the input node and a first node,
    the third switch coupled between the first node and a ground voltage potential,
    the capacitor coupled between the first node and a second node,
    the fourth switch coupled between the fourth node and the ground voltage potential, and
    the fifth switch coupled between the second node and the output node of the dual-phase inverting buck-boost power converter.

2. The dual-phase inverting buck-boost power converter of claim 1, operable in a first charging mode to conduct energy to the first inductor of the inverting buck-boost power converter.

3. The dual-phase inverting buck-boost power converter of claim 2, operable in a second charging mode to conduct energy to the second inductor substantially simultaneously with discharging energy from the capacitor to the output node of the dual-phase inverting buck-boost power converter.

4. The dual-phase inverting buck-boost power converter of claim 3, operable in a first discharging mode to conduct energy from the first inductor to the output node of the dual-phase inverting buck-boost power converter.

5. The dual-phase inverting buck-boost power converter of claim 4, operable in a second discharging mode to conduct energy from the second inductor to the capacitor to charge the capacitor.

6. The dual-phase inverting buck-boost power converter of claim 1, operable to receive a control signal to cause the inverting boost converter to supply the second load current.

7. The dual-phase inverting buck-boost power converter of claim 1, operable to supply the second load current when the dual-phase inverting buck-boost power converter receives a control signal indicating existence of a load requiring the second load current, and wherein the dual-phase inverting buck-boost power converter supplies the first load current when the dual-phase inverting buck-boost power converter does not receive the control signal indicating existence of the load requiring the second load current.

8. A dual-phase inverting buck-boost power supply, comprising:
    an inverting buck-boost power converter, to couple to a first inductor, and comprising:
        a first transistor coupled between an input node of the dual-phase inverting buck-boost power converter and a first node, wherein the first inductor is coupled between the first node and a ground voltage potential;
        a second transistor coupled between the first node and an output node of the dual-phase inverting buck-boost power converter; and
    an inverting boost power converter coupled in parallel with the inverting buck-boost power converter, to couple to a second inductor and a capacitor, and comprising:
        a third transistor coupled between a second node and the ground voltage potential, wherein the second inductor is coupled between the input node of the dual-phase inverting buck-boost power converter and a second node, and wherein the capacitor is coupled between the second node and a third node;
        a fourth transistor coupled between the third node and the ground voltage potential; and
        a fifth transistor coupled between the third node and the output node of the dual-phase inverting buck-boost power converter.

9. The dual-phase inverting buck-boost power supply of claim 8, wherein the first transistor is operable to receive a first control signal to couple the first inductor to the input node of the dual-phase inverting buck-boost power converter, and wherein the second transistor is operable to receive an inverse of the first control signal to couple the first inductor to the output node of the dual-phase inverting buck-boost power converter.

10. The dual-phase inverting buck-boost power supply of claim 8, wherein the third transistor is operable to receive a second control signal to couple the second inductor to the ground voltage potential, wherein the fourth transistor is operable to receive an inverse of the second control signal to couple the capacitor to the ground voltage potential, and wherein the fifth transistor is operable to receive the second control signal to couple the capacitor to the output node of the dual-phase inverting buck-boost power converter.

11. The dual-phase inverting buck-boost power supply of claim 8, operable to:

conduct energy to the first inductor of the inverting buck-boost power converter in a first charging mode; and conduct energy from the first inductor to the output node of the dual-phase inverting buck-boost power converter in a first discharging mode.

12. The dual-phase inverting buck-boost power supply of claim 11, further operable to:

conduct energy to the second inductor substantially simultaneously with discharging energy from the capacitor to the output node of the dual-phase inverting buck-boost power converter in a second charging mode; and conduct energy from the second inductor to the capacitor to charge the capacitor in a second discharging mode.

13. The dual-phase inverting buck-boost power supply of claim 8, further comprising a load capacitor and a load resistor coupled between the output node and the ground voltage potential.

14. A method of power conversion, comprising:

charging, during a first charging mode, a first inductor by coupling the first inductor to a voltage source and conducting energy from the voltage source to the first inductor;

charging, during a second charging mode, a second inductor by coupling the second inductor to a ground voltage potential to facilitate conduction of energy from the voltage source to the second inductor;

discharging, during the second charging mode, a capacitor by coupling the capacitor to an output node and conducting energy from the capacitor to the output node;

discharging, during a first discharging mode, the first inductor by coupling the first inductor to the output node and conducting energy from the first inductor to the output node; and charging, during a second discharging mode, the capacitor by discharging the second inductor by coupling the capacitor to the ground voltage potential to facilitate conduction of energy from the second inductor to the capacitor.

15. The method of claim 14, wherein charging the first inductor and discharging the first inductor are performed by an inverting buck-boost converter of a dual-phase inverting buck-boost converter.

16. The method of claim 15, wherein charging the second inductor, discharging the capacitor, and charging the capacitor are performed by an inverting boost converter of the dual-phase inverting buck-boost converter.

17. The method of claim 14, wherein charging the first inductor is performed in response to receipt of a first control signal, wherein charging the second inductor and discharging the capacitor are performed in response to receipt of a second control signal, and wherein the first control signal and the second control signal are independent of each other.

18. The method of claim 17, wherein discharging the first inductor is performed in response to receipt of an inverse of the first control signal, wherein charging the capacitor is performed in response to receipt of an inverse of the second control signal, and wherein the inverse of the first control signal and the inverse of the second control signal are independent of each other.

* * * * *